United States Patent
Zhang et al.

(10) Patent No.: US 7,594,964 B2
(45) Date of Patent: Sep. 29, 2009

(54) HIGH STRENGTH MAGNESIUM SLAG BRICK AND METHOD OF PRODUCING THE SAME

(75) Inventors: Jiqiang Zhang, Guiyang (CN); Qian Chen, Guiyang (CN)

(73) Assignee: MG Century Mining Corporation (CN)

( * ) Notice: Subject to any disclaimer, the term of this patent is extended or adjusted under 35 U.S.C. 154(b) by 0 days.

(21) Appl. No.: 12/229,154

(22) Filed: Aug. 19, 2008

(65) Prior Publication Data
US 2009/0025614 A1    Jan. 29, 2009

Related U.S. Application Data

(63) Continuation of application No. PCT/CN2007/000900, filed on Mar. 20, 2007.

(30) Foreign Application Priority Data

| Mar. 23, 2006 | (CN) | ......................... 2006 1 0200267 |
| Mar. 23, 2006 | (CN) | ......................... 2006 1 0200268 |
| Jun. 30, 2006 | (CN) | ......................... 2006 1 0200647 |
| Jun. 30, 2006 | (CN) | ......................... 2006 1 0200648 |
| Jul. 26, 2006 | (CN) | ......................... 2006 1 0200744 |

(51) Int. Cl.
*C04B 5/00* (2006.01)
(52) U.S. Cl. .................. 106/789; 106/790; 106/791; 264/333
(58) Field of Classification Search .................. 106/789, 106/790, 791; 264/333
See application file for complete search history.

(56) References Cited

FOREIGN PATENT DOCUMENTS

| CN | 85108073 | 5/1987 |
| CN | 1236747 | 12/1999 |

(Continued)

OTHER PUBLICATIONS

CN 1401605 (Mar. 12, 2003) Zhu abstract only.*

(Continued)

*Primary Examiner*—Paul Marcantoni
(74) *Attorney, Agent, or Firm*—Martine Penilla & Gencarella, LLP

(57) ABSTRACT

This invention discloses a high strength magnesium slag brick and a method of producing the same. The high strength magnesium slag brick is composed of 60 to 80 percent by weight of furnace slag from the reduction process of a magnesium production, 15 to 25 percent by weight of crushed stones and/or pebbles, and 1 to 15 percent by weight of gypsum and/or lime. And the amount of water added to the composition is equivalent to 10 to 40 percent of the total weight of raw materials. The method includes dispensing of raw materials, adding of water, mingling, leaving it piled-up, pressing and molding, steam-bathing and drying to obtain the finished product. Gypsum, one of the raw materials of the slag brick, can be produced from the waste gas generated from the magnesium production process. And, the coal cinder or coal ash generated from the burning of coal in the magnesium production process, can also be used as one of the raw materials of the slag brick. This invention uses massive volume of furnace slag from the reduction process of a magnesium production, and together with aforesaid raw materials, to produce construction bricks, easing the environmental pollution problem on one hand, and introducing a new environmental building material on the other hand. The method of producing high strength magnesium slag brick of this invention is simple and is easy to manage. The raw materials are readily available. The production cycle is shorter than conventional processes. The strength of the magnesium slag brick meets the standard of construction brick. And most of all, it is very environmental friendly and economical.

18 Claims, 2 Drawing Sheets

FOREIGN PATENT DOCUMENTS

| | | |
|---|---|---|
| CN | 1451616 | 10/2003 |
| CN | 1539565 | 10/2004 |
| CN | 1673168 | 9/2005 |

OTHER PUBLICATIONS

Du, Shiyoung, *English Translation Abstract of CN1539565*, Oct. 27, 2004.

Jaiying Colldge, *English Translation Abstract of CN1451616*, Oct. 29, 2003.

Xu, Yuzhong, *English Translation Abstract of CN1236747*, Dec. 1, 1999.

Shanghai Jingan New Building Material SC, *English Translation Abstract of CN1673168*, Sep. 28, 2005.

Student Sci. &Tech, *English Translation Abstract of CN85108073*, May 6, 1987.

Zhu, Guilin et al., *Current Status and Development of Utilization of Metallurgical Slag as Resources Materials*, 2002-2003, China Resources Comprehensive Utilization.

Zhang, Xixian et al., *A Study on the Road Performance of Industrial Waste Magneisum Slag*, 1997, Central South Highway Engineering.

\* cited by examiner

HIGH STRENGTH MAGNESIUM SLAG BRICK AND METHOD OF PRODUCING THE SAME

CLAIM OF PRIORITY

This application claims priority under 35 U.S.C. §§ 120 and 365(c) as a continuation application of prior International Application PCT/CN2007/000900, which was filed on Mar. 20, 2007, and which was not published in English under PCT Article 21(2). The disclosure of the prior international application is incorporated herein by reference.

TECHNICAL FIELD

This invention relates generally to a kind of high strength magnesium slag brick, which is especially related to the construction material, and its method of production, by using the furnace slag from the reduction process of magnesium production.

BACKGROUND ART

The industrial production of magnesium produces massive volume of furnace slag in reduction process as well as coal cinder/ash, and both are harmful to the environment if dumped freely, but the processing cost is quite burdensome to magnesium producers. At present, most industrial waste brick producers use coal ash as their raw material, and although there are methods of producing brick from the furnace slag of a magnesium production, the methods have shortcomings such as substandard quality of the slag brick and long production cycle. Therefore, the conventional methods are not economical for industrial production. Moreover, waste gas produced from the burning of fossil fuel, such as coal, heavy oil, coal gas and water coal mixture, in the magnesium production process, contains sulphur dioxide. Most of the existing magnesium producers discharge untreated waste gas directly into the atmosphere, and thereby, resulting in serious air pollution.

DISCLOSURE OF INVENTION

An object of the present invention is to provide a high strength magnesium slag brick and a method of producing the same. The method is to produce high strength brick, which can be used for construction, by using furnace slag from the reduction process of a magnesium production. The method is easy to manage, the raw material is readily available and the production cycle is short. The invention recycles the industrial waste, and thereby, reduces pollution to the environment.

Another object of the present invention is to use the waste gas from the kilns, furnaces, ovens, boilers and so on, to produce one of the raw materials of the aforesaid high strength magnesium slag brick, gypsum. Such process helps to recycle waste, create economy benefits and reduce impact on the environment.

An art technique of this invention is a high strength magnesium slag brick that is composed of the following raw materials, according to the weight proportion, and water: 60 to 80 percent of furnace slag from the reduction process of a magnesium production, 15 to 25 percent of crushed stones and/or pebbles, and 1 to 15 percent of gypsum and/or lime. The amount of water added to aforesaid slag brick is equivalent to 10 to 40 percent of the total weight of raw materials.

The gypsum used in the aforesaid slag brick is provided through the following method: mix the waste gas, which contains sulphur dioxide, of the magnesium production, with a solution of slaked lime or a solution of calcium carbide sludge to produce a gypsum mixture, and perform a drying process to obtain the gypsum. The gypsum is preferably to be natural gypsum, phosphogypsum, fluro-gypsum or other industry by-product gypsums.

The crushed stones and/or pebbles in the aforesaid slag brick are natural stones or industry waste residue that do not exceed 10 mm in grain size and are preferably to be limes stone, blast furnace slag or phosphorus slag that do not exceed 7 mm in grain size.

The lime in the aforesaid slag brick is quick-lime, slaked-lime or calcium carbide sludge that can produce calcium hydroxide.

The aforesaid slag brick further includes 5 to 25 percent, of the total weight of raw materials, of coal cinder and coal ash, wherein the coal cinder and coal ash is the burnt coal residue from coal gas generators, kilns, furnaces, ovens or boilers, which burns coal.

Another art technique of this invention is a method of producing the aforesaid high strength magnesium slag, and the method includes two processes: (a) and (b), which are described below.

(a) Firstly, an appropriate amount of water is added to the furnace slag from the reduction process of a magnesium production and the mixture is left piled-up for 12 hours or more, or, the furnace slag from the reduction process of a magnesium production is left piled-up for 24 hours or more. Secondly, the piled mixture or the piled furnace slag is mixed evenly with the other raw materials, such as crashed stones/pebbles, gypsum and/or lime, and water, according to the weight proportion, to obtain product A.

OR,

First, the furnace slag from the reduction process of a magnesium production and the other raw materials, such as crashed stones/pebbles, gypsum and/or lime, are mixed according to the proportion, and the mixture is left piled-up for 24 hours or more. Second, the mixture is mixed evenly with an appropriate proportion of water to obtain product A.

OR,

The furnace slag from the reduction process of a magnesium production is firstly mixed with the other raw materials such as crashed stones/pebbles, gypsum and/or lime, according to the proportion, and an appropriate amount of water. The mixture is secondly left piled-up for 12 hours or more to obtain product A.

(b) The product A is pressed and molded into brick shape, and the pressed product A is dried to obtain the high strength magnesium slag brick.

Yet another art technique of this invention is a method of producing the aforesaid high strength magnesium slag brick, and the method includes two processes: (a) and (b), which are described below.

(a) The furnace slag from the reduction process of a magnesium production is steam-bathed for 1 to 3 hours to obtain product A.

(b) The product A is mixed evenly with the other raw materials, which include crushed stones and/or pebbles, gypsum and/or lime, and water, and the mixture is pressed into brick shape and dried to obtain the high strength magnesium slag brick.

The process (b) of the aforesaid method of producing slag brick further includes, after pressing the product A into the shapes of brick, steam-bathe the pressed product A for 1 to 12 hours.

The gypsum used in the aforesaid method of producing slag brick is provided through the following method: mix waste gas containing sulphur dioxide with a solution of slaked lime or a solution of calcium carbide sludge to produce a gypsum mixture, and then perform a drying process to the gypsum mixture to obtain the gypsum, wherein the waste gas is produced from the magnesium production, such as from kilns, furnaces, ovens, boilers and so on, by the burning of fossil fuel, such as coal, heavy oil, coal gas and water coal mixture, in the magnesium production process.

The slag brick made by the aforesaid method further includes, in its composition, the weight ratio of 5 to 25 percent, of the total weight of raw materials, of coal cinder and coal ash, wherein the coal cinder and coal ash is the burnt coal residue from coal gas generators, kilns, furnaces, ovens or boilers, which burns coal.

This invention provides a higher strength magnesium slag brick, and its method of production, over the conventional product and its method. This invention uses massive volume of furnace slag from the reduction process of a magnesium production, adds appropriate raw materials, or coal cinder and coal ash, and processes the raw material composition with appropriate method to produce construction bricks, easing the environmental pollution problem on one hand, and introducing a new environmental friendly building material on the other hand. The production method of this invention is simple and easy to manage. The raw materials are readily available. The strength of the magnesium slag brick reaches more than 25 MP(a), meeting the standard of construction brick.

BEST MODE FOR CARRYING OUT THE INVENTION

Figure 1:
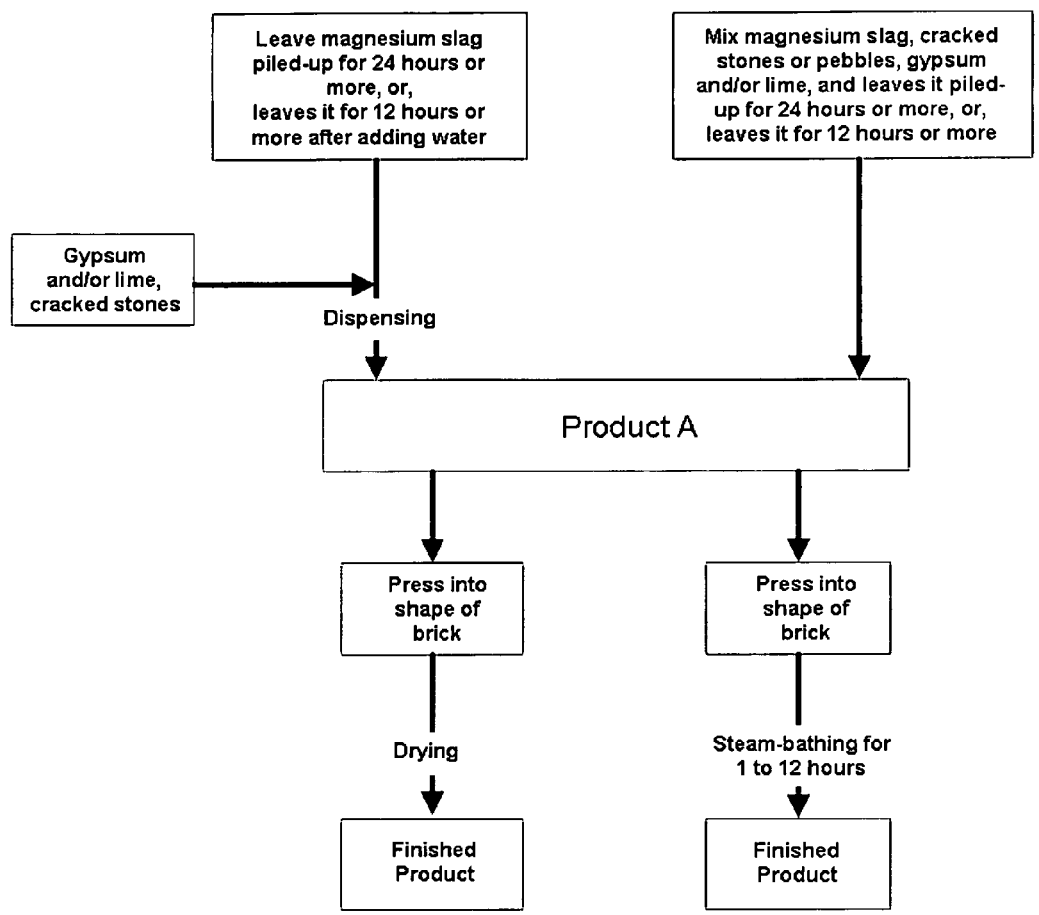
FIG. 1 is a schematic flow chart of a method of producing high strength magnesium slag brick according to an embodiment of the invention.

Referring first to FIG. 1, illustrated therein is a schematic flow chart of a method of producing high strength magnesium slag brick of the invention. The embodiments are described below.

Preferred embodiment 1 is to produce magnesium slag brick according to the following process (a) and process (b).

(a) Mix evenly 700 Kg of furnace slag from the reduction process of a magnesium production and 200 Kg of water, leave the mixture piled-up for 2 days, and mix the piled mixture evenly with 200 Kg of cracked stones, 100 Kg of gypsum and 100 Kg of lime, to obtain product A.

OR,

Mix evenly 700 Kg of furnace slag from the reduction process of a magnesium production, 200 Kg of cracked stones, 100 Kg of gypsum and 100 Kg of lime, stir 200 Kg of water into the mixture, and leave the stirred mixture piled-up for 2 days, to obtain product A.

(b) Press and mold the product A into brick shape, and dry the pressed product A to obtain finished product—the magnesium slag brick.

Preferred embodiment 2 is to produce magnesium slag brick according to the following process (a) and process (b).

(a) Mix evenly 750 Kg of furnace slag from the reduction process of a magnesium production and 250 Kg of water, leave the mixture piled-up for 3 days, and mix the piled mixture evenly with 120 Kg of cracked stones, 120 Kg of gypsum and 130 Kg of lime, to obtain product A.

OR,

Mix evenly 750 Kg of furnace slag from the reduction process of a magnesium production, 120 Kg of cracked stones, 120 Kg of gypsum and 130 Kg of lime, and stir 250 Kg of water into the mixture, and leave the stirred mixture piled-up for 3 days, to obtain product A.

(b) Press and mold the product A into brick shape, and steam-bathe the pressed product A for 4 to 6 hours to obtain finished product—the magnesium slag brick.

Preferred embodiment 3 is to produce magnesium slag brick according to the following process (a) and process (b).

(a) Steam-bathe 700 Kg of the furnace slag from the reduction process of a magnesium production for 2 hours to obtain product A.

(b) Mix evenly the product A, 200 Kg of crushed stones, 100 Kg of gypsum and 100 Kg of lime, with water, press the mixture into brick shape, and dry the pressed mixture to obtain finished product—the magnesium slag brick.

Preferred embodiment 4 is to produce magnesium slag brick according to the following process (a) and process (b).

(a) Steam-bathe 750 Kg of furnace slag from the reduction process of a magnesium production for 2 hours to obtain product A.

(b) Mix evenly the product A, 200 Kg of crushed stones and 120 Kg of gypsum, with water, press the mixture into brick shape, dry the pressed mixture to obtain finished product— the magnesium slag brick.

Preferred embodiment 5 is to produce magnesium slag brick according to the following process (a) and process (b).

(a) Steam-bathe 700 Kg of furnace slag from the reduction process of a magnesium production for 2 hours to obtain product A.

(b) Mix evenly the product A, 190 Kg of crushed stones and 80 Kg of gypsum, with water, press the mixture into brick shape, and dry the pressed mixture to obtain finished product—the magnesium brick.

100 Kg of coal cinder or coal ash could be added to the process (a) of preferred embodiment 1 and preferred embodiment 2, aforesaid, and, process (b) of preferred embodiment 3 and preferred embodiment 4, aforesaid.

In the aforesaid 5 preferred embodiments, the furnace slag from the reduction process of a magnesium production could be the residue from a thermal reduction process; the thermal reduction process includes, but not limited to, silicothermic reduction process, aluminothermic reduction process, carbothermic reduction process, and other magnesium production processes. The cracked stones are the structural material, and are preferably to be limestone, blast furnace slag or phosphorus slag that do not exceed 7 mm in grain size, but it can be natural stones or industry waste residue that do not exceed 10 mm in grain size. The gypsum is preferably to be natural gypsum, phosphogypsum, fluro-gypsum or other industry by-product gypsums. The lime is quick-lime, slaked-lime or calcium carbide sludge that can produce calcium hydroxide.

In the aforesaid preferred embodiment 2, 3, 4, and 5, the steam refers to water vapor, and the purpose of steam-bathing is to shorten the production cycle of high strength magnesium slag brick.

Figure 2:
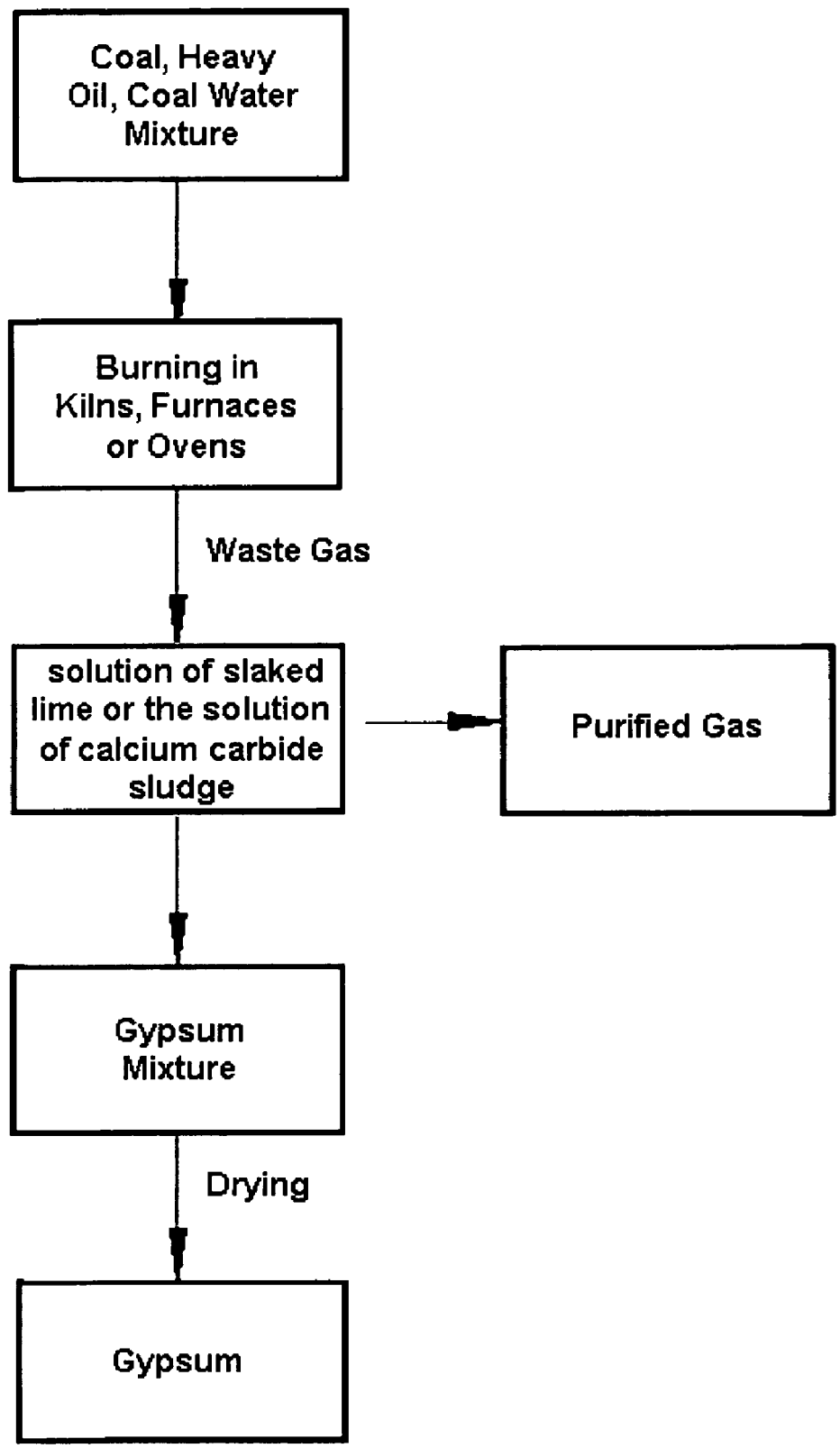
FIG. 2 is a schematic flow chart a method of production of gypsum according to an embodiment of the invention, by using waste gas produced in magnesium production process.

On the other hand, in consideration of environmental protection, conservation of energy and the recycle of waste gas, it is ideal to use the waste gas produced from the magnesium production to manufacture the high strength magnesium slag brick. The waste gas produced from kilns, furnaces, ovens and boilers, which burn fossil fuel, such as coal, heavy oil, coal gas and water coal mixture, in the magnesium production process. The waste gas which contains sulphur dioxide could react with a solution of slaked lime or a solution of calcium carbide sludge to produce a gypsum mixture that can be dried to obtain gypsum. Gypsum is one of the raw materials of the slag brick. Moreover, such process also greatly lowers the content of sulphur dioxide in the waste gas and the purified waste gas could meet the standard of discharge. FIG. 2 is a schematic flow chart of the production of gypsum according to an embodiment of the invention, by using waste gas produced in the magnesium production process.

INDUSTRIAL APPLICABILITY

The invention provides a high strength magnesium slag brick for construction use and a method of producing such high strength magnesium slag brick. The invention uses massive volume of furnace slag from the reduction process of a magnesium production, and with raw materials, which may include coal cinder and coal ash and gypsum produced from waste gas, to form the composition of the slag brick. The use of by-products or residue from metal production processes as raw material by the invention eases the environmental pollution problem, and at the same time, a new and environmental friendly building material is introduced. The strength of the magnesium slag brick of the invention is higher than that of magnesium slag bricks made by conventional methods and meets the standard of construction brick.

What is claimed is:

1. A high strength magnesium slag brick comprising water and a composition of raw materials, wherein the composition of raw materials comprises:
   60 to 80 percent by weight of furnace slag from the reduction process of a magnesium production;
   15 to 25 percent by weight of crushed stones and/or pebbles; and
   1 to 15 percent by weight of gypsum and/or lime.

2. The slag brick of claim 1, wherein the amount of water added to the composition is equivalent to 10 to 40 percent of the total weight of raw materials.

3. The slag brick of claim 1, wherein the gypsum is provided through the following method: mixing the waste gas, which contains sulphur dioxide, of the magnesium production process, with a solution of slaked lime or a solution of calcium carbide sludge to produce a gypsum mixture; and drying the gypsum mixture to obtain the gypsum.

4. The slag brick of claim 1, wherein the crushed stones and/or pebbles are natural stones, limestone, blast furnace slag or phosphorus slag, or industry waste residue that do not exceed 10 mm in grain size.

5. The slag brick of claim 1, wherein the gypsum is natural gypsum, phosphogypsum, fluro-gypsum or other industry by-product gypsums, and, the lime is quick-lime, slacked-lime or calcium carbide sludge that can produce calcium hydroxide.

6. The slag brick of claim 1, wherein the composition of raw materials further comprises 5 to 25 percent by weight of coal cinder and coal ash.

7. The slag brick of the claim 6, wherein the coal ash is the burnt coal residue from coal gas generators, kilns, furnaces, ovens or boilers, which burns coal.

8. A method of producing high strength magnesium slag brick, wherein the raw material composition of the slag brick comprises: 60 to 80 percent by weight of furnace slag from the reduction process of a magnesium production, 15 to 25 percent by weight of crushed stones and/or pebbles, and 1 to 15 percent by weight of gypsum and/or lime, the method comprising the following processes:

(a) adding an appropriate amount of water to the furnace slag from the reduction process of a magnesium production, leaving the water and the furnace slag piled-up for 12 hours or more, and mixing the piled furnace slag evenly with the other raw materials, or, mixing evenly all of the raw materials and an appropriate amount of water, and leaving the mixture piled-up for 12 hours or more, to obtain product A;

or, leaving the furnace slag from the reduction process of a magnesium production piled-up for 24 hours or more, and mixing evenly the piled furnace slag and the other raw materials with an appropriate amount of water, or, mixing all of the raw materials, leaving the mixed raw materials piled-up for 24 hours or more, and stirring/adding an appropriate proportion of water into the piled mixed raw materials, to obtain product A; and (b) pressing the product A into brick shape and drying the pressed product A to obtain the slag brick.

9. The method of producing slag brick of claim 8, wherein the gypsum is provided through the following method: mixing the waste gas, which contains sulphur dioxide, of the magnesium production, with a solution of slaked lime or a solution of calcium carbide sludge to produce a gypsum mixture; and drying the gypsum mixture to obtain the gypsum.

10. The method of producing slag brick of claim 8, wherein the gypsum is natural gypsum, phosphogypsum, fluro-gypsum or other industry by-product gypsums, and, the lime is quick-lime, slacked-lime or calcium carbide sludge that can produce calcium hydroxide.

11. The method of producing slag brick of claim 8, wherein the process (b) further comprises: after pressing the product A into brick shape, steam-bathing the pressed product A for 1 to 12 hours.

12. The method of producing slag brick of claim 8, wherein the raw material composition of the slag brick further comprises 5 percent to 25 percent by weight of coal cinder and coal ash.

13. The method of producing slag brick of the claim 12, wherein the coal cinder and coal ash is the burnt coal residue from coal gas generators, kilns, furnaces, ovens or boilers, which burns coal.

14. A method of producing high strength magnesium slag brick, wherein the raw material composition of the slag brick comprises: 60 to 80 percent of furnace slag from the reduction process of a magnesium production, 15 to 25 percent of crushed stones and/or pebbles, and 1 to 15 percent of gypsum and/or lime, according to the weight proportion of total raw material, the method comprising the following processes:

(a) steam-bathing the furnace slag from the reduction process of a magnesium production for 1 to 3 hours to obtain product A; and (b) mixing evenly the product A and the other raw materials, which includes crushed stones and/or pebbles, gypsum and/or lime, with water, pressing the mixture into brick shape, and drying the pressed mixture to obtain the slag brick.

15. The method of producing slag brick of claim 14, wherein the gypsum is provided through the following method: mixing the waste gas, which contains sulphur dioxide, of the magnesium production, with a solution of slaked lime or a solution of calcium carbide sludge to produce a gypsum mixture; and drying the gypsum mixture to obtain the gypsum.

16. The method of producing slag brick of claim 14, wherein the process (b) further comprises: after pressing the mixture into brick shape, steam-bathing the pressed mixture for 1 to 12 hours.

17. The method of producing slag brick of claim 14, wherein the raw material composition of the slag brick further comprises 5 to 25 percent, of the total weight of raw materials, of coal cinder and coal ash.

18. The method of producing slag brick of claim 17, wherein the coal cinder and coal ash is the burnt coal residue from coal gas generators, kilns, furnaces, ovens or boilers, which burns coal.

* * * * *